March 21, 1933.  M. J. WALL  1,902,051
HEAT RETAINING MEANS FOR AUTOGENOUS WELDING AND METHOD OF WELDING
Filed June 20, 1929  2 Sheets-Sheet 1
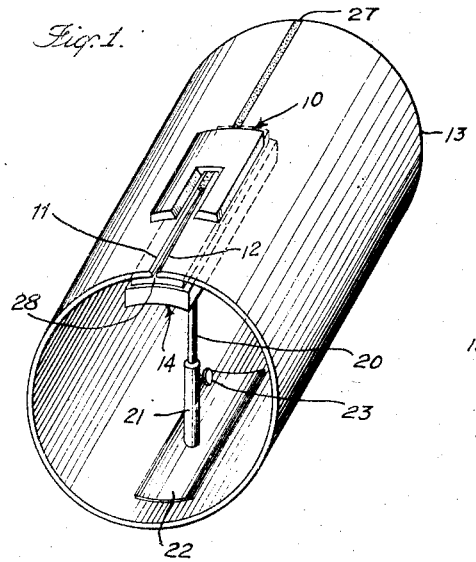
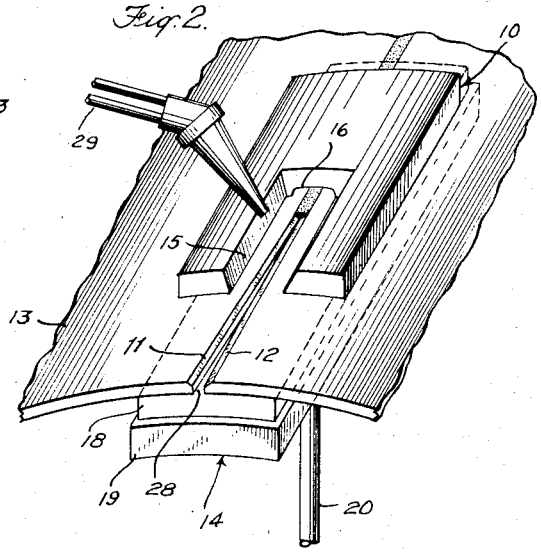
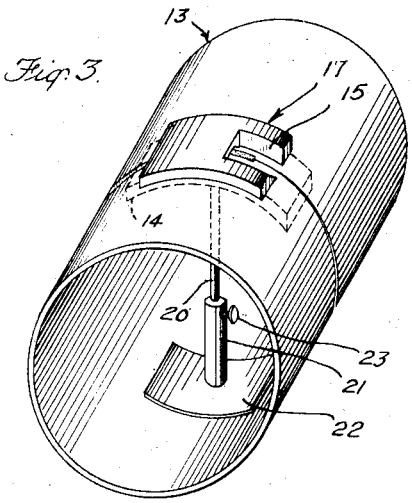
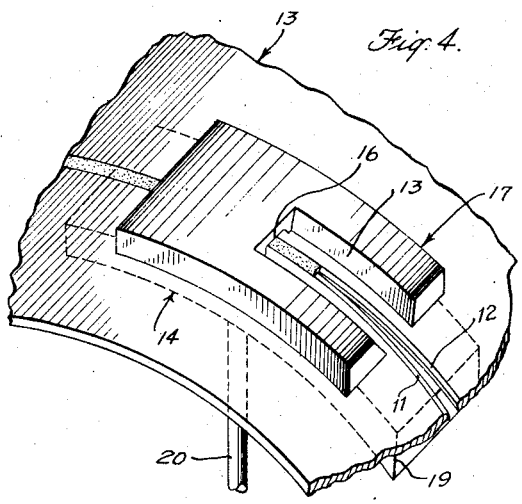
Matthew J. Wall, INVENTOR,
BY
Byrnes Townsend & Eichenstein, ATTORNEYS.

March 21, 1933.  M. J. WALL  1,902,051

HEAT RETAINING MEANS FOR AUTOGENOUS WELDING AND METHOD OF WELDING

Filed June 20, 1929  2 Sheets-Sheet 2

Matthew J. Wall, INVENTOR,

BY
ATTORNEYS.

Patented Mar. 21, 1933

1,902,051

UNITED STATES PATENT OFFICE

MATTHEW J. WALL, OF JERSEY CITY, NEW JERSEY, ASSIGNOR TO THE LINDE AIR PRODUCTS COMPANY, A CORPORATION OF OHIO

HEAT RETAINING MEANS FOR AUTOGENOUS WELDING AND METHOD OF WELDING

Application filed June 20, 1929. Serial No. 372,501.

This invention pertains to autogenous welding and more specifically to means for conserving the welding heat during the welding operation and for retaining the welding heat in the newly formed weld.

In the art of autogenous welding it is well known that the welding speed may be increased by preheating the metal to be welded, and that the time saved by the increased speed is offset by the cost of preheating. It is also well known that a large part of the welding heat escapes. Therefore, one object of this invention is to provide means for conserving the escaping welding heat and thereby increasing the welding speed without proportionately increasing the welding cost.

When making a linear weld along the abutting edges of metal sheets the rapidly cooling weld and heated metal adjacent thereto shrinks and draws the unwelded edges together, as the weld progresses. In order to compensate for this action it is the custom to separate the edges of the sheets at one end of the joint a quarter of an inch for each foot of joint length. For example, a 16 foot joint would be separated from 3½ to 4 inches at the outer end. It is well known that when the shrinking weld draws the edges of metal sheets together in this manner that it causes undesirable distortion and sets up undesirable strains in the metal. Therefore, another object of this invention is to provide means for retaining the welding heat in the newly formed weld so it shrinks more slowly and less undesirable distortion and strain are produced in the welded metal.

Other aims, objects, and novel features will be apparent from the following specification and the accompanying illustration, in which:

Fig. 1 is a perspective of a metal cylinder with my improved heat retaining means in position for welding the longitudinal seam thereof;

Fig. 2 is a fragmentary view of a portion of the cylinder of Fig. 1 showing the heat retaining means somewhat enlarged;

Fig. 3 is a perspective of the abutting ends of two metal cylinders showing my improved heat retaining means in position for welding the girth seam therebetween;

Fig. 4 is a fragmentary view of a portion of the cylinders of Fig. 3 showing the heat retaining means somewhat enlarged;

Broadly this invention comprises heat retaining means especially adapted to retain the heat in a weld both during and just after the time it is being formed along the abutting edges of two metal sheets or along two abutting edges of the same sheet such as the longitudinal seam of a metal cylinder or boiler.

Figure 8:
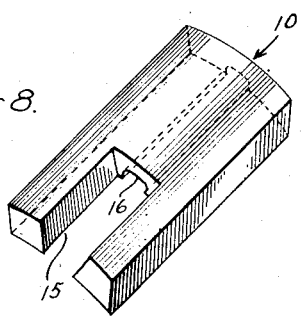
Fig. 8 is a perspective of the upper part or hood of the heat retaining means shown in Figs. 1 and 2.
Figure 9:
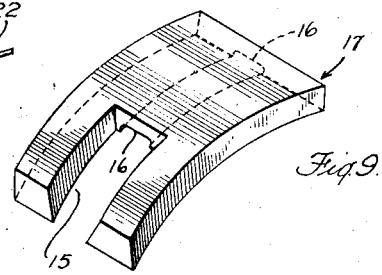
Fig. 9 is a perspective of the upper part or hood of the heat retaining means shown in Figs. 3 and 4.

One embodiment of the invention comprises a hood 10 adapted for resting on the upper surface of the abutting edges 11 and 12 of a sheet metal boiler 13, and a plate 14 adapted for being held against the under surface of the abutting edges 11 and 12 directly underneath the hood 10. The hood 10 may be of any suitable refractory material such as fire brick, and be provided with a rectangular recess 15 in one end and a longitudinal groove 16 in the bottom thereof. The hood may be of any convenient shape such as rectangular and preferably the rectangular recess 15 is located longitudinally in one end, and the longitudinal groove 16 is located in alignment with the recess 15 so one end of the groove 16 joins one end of the recess 15 and so both extend lengthwise of the hood. The size of the recess 15 may vary according to the thickness of the metal being welded and consequently the size of the welding flame, but the sides of the recess should preferably flare outward at a slight angle. When the hood is used with a blowpipe the recess should be large enough to permit the flame to escape without choking and, at the same time, confine and reflect the heat thereof back on the weld and also on the joint just ahead of the weld so the joint is preheated ahead of the point where the weld is formed. Preferably, the under side of the hood 10 should conform to the shape of the metal sheet or sheets upon which it rests to prevent the escape of heat between the sheet and the hood. For instance, a hood adapted for welding longitudinal seams in cylindrical boilers, such as that shown in Fig. 1, may be curved laterally like the hood 10 of Figs. 1, 2, and 8; and a hood adapted for welding the girth seams in a cylindrical boiler, such as that shown in Fig. 3, may be curved longitudinally like the hood 17 of Figs. 3, 4, and 9. The groove 16, shown more clearly in Figs. 10, 11, and 12, should be deep enough and wide enough to clear the weld as the hood 10 is moved along over it, and also deep enough to permit part of the heat from the welding flame to escape through the groove for a purpose that will be described presently.

Figure 7:
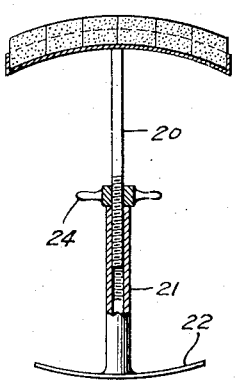
Fig. 7 is an alternative means for adjusting the height of the stands shown in Figs. 5 and 6.

The plate 14 may be of any suitable material such as fire brick and, for convenience, it may comprise a plurality of individual fire brick 18 of any convenient size or shape carried by a stand composed of a metal tray 19 that is attached to the upper end of an adjustable leg having an upper portion 20 that telescopes in a lower portion 21 joined to a base 22. A set screw 23 threaded into the side of the lower portion 21 may be tightened against the upper portion 20 to hold the leg in any adjusted position. Other means for adjusting the height of the stand may be employed such as that shown in Fig. 7 comprising a manually operable wing nut 24 threaded on the upper portion of the stand leg and resting against the top of the lower portion.

Figure 5:
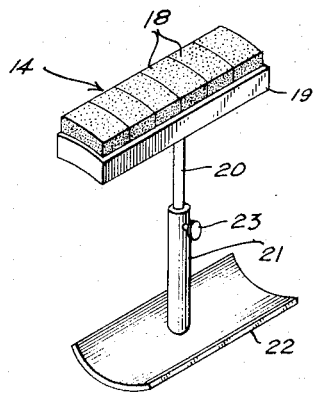
Fig. 5 is a perspective of the under part or plate of the heat retaining means of Figs. 1 and 2 and the supporting stand therefor.
Figure 6:
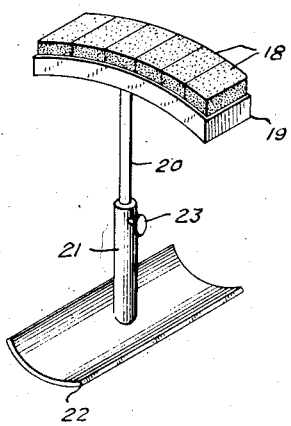
Fig. 6 is a perspective of the under part or plate of the heat retaining means of Figs. 3 and 4 and the supporting stand therefor.

The upper surface of the fire brick 18 may be curved to conform to the surface against which they are held, such as the inner surface of the boiler 13, or both the fire brick 18 and the stand 19 may be curved. Also, the base 22 of the stand may be curved to conform to the inner surface of the boiler 13 on which it stands. A plate 14 adapted for use when welding a longitudinal seam, such as that shown in Fig. 1, may have an upper surface curved laterally as shown in Figs. 1, 2, and 5, and a plate adapted for use when welding a girth seam, such as that shown in Fig. 3 may have an upper surface curved longitudinally as shown in Figs. 3, 4, and 6. Of course it is understood that the illustrations are only examples and that both the hood 10 and the plate 14 may be provided with working faces of other forms from those shown so they will conform to the contour of the surfaces upon which they are used. Also, the plate 14 may be supported by means other than that shown or, in some instances, it may form a refractory table upon which metal objects are welded.

Figure 10:
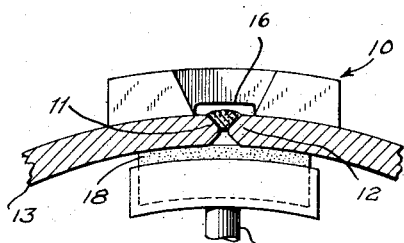
Fig. 10 is an end view of my improved heat retaining means showing a groove in the hood suitable for use when forming the first side of a double V weld between the abutting edges of two metal sheets.
Figure 12:
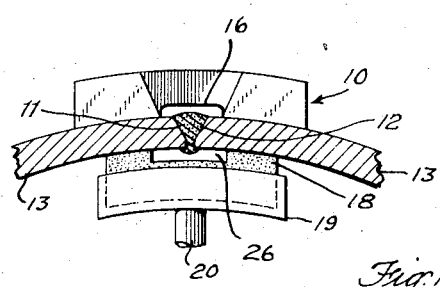
Fig. 12 is an end view of my improved heat retaining means showing a groove in both the hood and plate suitable for use when forming a single V weld between the abutting edges of two metal sheets.
Figure 11:
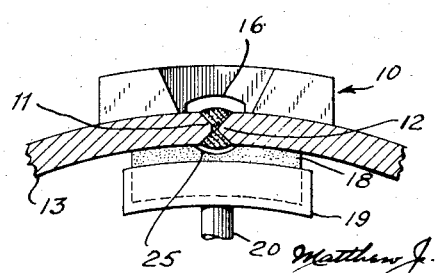
Fig. 11 is an end view of my improved heat retaining means showing a groove in both the hood and plate suitable for use when forming the second side of the double V weld of Fig. 10.

The upper surface of the plate 14 may be smooth, as shown in Fig. 10, or it may have a groove 25 or 26 therein as shown in Figs. 11 and 12. The groove 25, shown in Fig. 11, is adapted to closely fit the finished side of a double V weld, while the groove 26, shown in Fig. 12, is adapted to clear either side of any type of weld.

As already stated the size of both the hood and plate may vary but, as a specific example, a hood that has proven satisfactory in use was 26 inches long, 12 inches wide, and 3 inches thick; with a rectangular recess 8 inches long and 3½ inches wide in one end. While the plate may have the same horizontal dimensions as the hood there is an advantage in having it longer as then a longer section of the joint may be welded without stopping to move the plate.

It is well known in the art of welding that when two metal edges are abutted together along their entire length and a fusion weld is started along the joint therebetween, that before it has progressed any great distance the contraction of the heated weld and surrounding metal draws the edges together so one overlaps the other. In order to allow for this contraction and drawing together of the edges they are usually separated at one end so the edges form an acute angle. The amount of separation is usually about a quarter of an inch for each foot in length. When such a seam is welded in the usual manner these separated edges are drawn together and undesirable strains are set up in the metal but, by the use of the heat retaining means described herein, these strains may be largely eliminated as it is necessary to separate the edges only about one third the usual distance. For example, a separation of one and one quarter inches has been found sufficient for a seam 16 feet long. In addition to retaining the heat in the weld and thereby reducing the strain and distortion, the heat retaining means described herein also reflects part of the escaping welding heat back on the joint thereby preheating it. This reduces the amount of welding heat required and also increases the welding speed. In some instances this increase has been as much as from 30% to 50%.

While the method of using the heat retaining means may vary somewhat according to the position and shape of the joint being welded, a description of its use in connection with the longitudinal seam in a boiler, such as that shown in Fig. 1, will illustrate how the objects of this invention are attained by its use.

The boiler 13 may be prepared for welding by placing the joint or seam on the upper side where it may be easily reached by the welder. The edges 11 and 12 should, of course, have previously been beveled in the customary manner well known in the art. One end 27 of the joint may be brought together or abutted, and the other end 28 may be separated a distance of about ¼ inch for each 3 feet of seam length. The amount of separation may vary for different classes of work the same as it has heretofore when no heat retaining means were used but, as a general rule, the separation should be about ⅓ that necessary when no heat retaining means are employed. The means for holding the edges of the seam in position for welding may be the same as those already well known in the art and which, for the sake of simplicity, are not shown.

The plate 14 may be placed against the under side of the portion of the seam where the weld is to be started and held there by loosening the set screw 23 and extending the leg of the stand until the base 22 rests firmly against the bottom of the boiler and then securing it in place by tightening the set screw 23. When a smooth plate is used, such as that shown in Fig. 10 it should be positioned so the seam is approximately in the center thereof, and when a grooved plate is used, such as those shown in Figs. 11 and 12, it should be positioned so the seam is over the groove. The purpose of the plate is to prevent the escape of the heat so, regardless of which type is used, it should be positioned so it extends several inches each side of the seam.

The hood 10 should be placed on the seam so the point at which the weld is to be started in within the recess 15, and so the open end of the recess points in the direction the weld is to proceed. The weld may be formed with any suitable welding apparatus such as an oxy-acetylene blowpipe 29, of which only a portion is shown, and as the weld progresses the hood is moved along the seam so the weld is always formed in the recess 15.

Within a short time after the weld has been started the flaring sides of the recess 15 become heated and reflect considerable of the escaping welding heat back on the weld and on the seam ahead of the weld so it is preheated and the welding operation then progresses faster than when no heat retaining means is employed. The plate 14 tends to hold the heat in the weld and the surrounding metal by preventing much of the radiation from the under side of the seam and this, also, tends to increase the welding speed.

As the welding progresses and the hood 10 is moved along the seam the newly formed portion of the weld is covered by the groove 16 on the top, and the plate 14 on the bottom; both of which prevent much of the heat from escaping so the weld remains in a heated condition much longer than when no heat retaining means are employed. In addition, part of the escaping welding heat and flame travel back along the newly formed portion of the weld through the groove 16 and this still further tends to keep the weld in a heated condition much longer than usual. Therefore, as the welding heat is retained in the weld much longer than usual, the heated weld and surrounding metal consequently contract much slower than usual, and the objectionable strains and distortions set up in the weld and surrounding metal as a result of the contraction are much less than when no heat retaining means are employed.

It is understood, of course, that the foregoing detailed description covers only one of many applications of this invention and that the form, size, and arrangement of the component parts of the mechanism may be different from that shown and described without departing from the invention or sacrificing any rights thereof.

I claim:

1. Heat retaining means for autogenous welding comprising a hood provided with a recess adapted for partially surrounding a weld during the formation thereof, and a groove adapted for covering the newly formed portion of said weld.

2. Heat retaining means for autogenous welding comprising a hood of refractory material provided with a recess adapted for partially surrounding a weld during the formation thereof, and a groove adapted for covering the newly formed portion of said weld and for conducting a portion of the escaping welding heat therealong.

3. Heat retaining means for autogenous welding comprising a hood of fire brick provided with a recess adapted for partially surrounding a weld during the formation thereof, and a groove adapted for covering the newly formed portion of said weld and for conducting a portion of the escaping welding heat therealong.

4. Heat retaining means for autogenous welding comprising a rectangular hood of fire brick provided with a rectangular recess in one end thereof adapted for partially surrounding a weld during the formation thereof, and a longitudinal groove in the bottom thereof joining said recess and adapted for covering the newly formed portion of said weld.

5. Heat retaining means for autogenous welding comprising a rectangular hood of fire brick provided with a rectangular recess positioned longitudinally in one end thereof and adapted for partially surrounding a weld during the formation thereof, and a longitudinal groove in the bottom thereof joining the inner end of said recess and adapted for covering the newly formed portion of said weld.

6. Heat retaining means for autogenous welding comprising a hood of refractory material provided with a recess in one end thereof having flaring sides adapted for partially surrounding a weld during the formation thereof, and a groove therein joining said recess and adapted for covering the newly formed portion of said weld.

7. The combination in means for retaining heat in an autogenous weld being formed along the abutting edges of two metal sheets; of a hood adapted for resting on the upper surface of said sheets and provided with a recess for partially surrounding the portion thereof being welded and a groove for covering the newly formed portion of said weld; and a plate adapted for being held against the under surface of said sheets to cover the portion thereof being welded.

8. The combination in means for retaining heat in an autogenous weld being formed along the abutting edges of two metal sheets; of a hood adapted for resting on the upper surface of said sheets and provided with a recess for partially surrounding the portion thereof being welded, and a groove for covering the newly formed portion of said weld; and a plate adapted for being held against the under surface of said sheets and provided with a groove for covering the portion of said sheets being welded and also the newly formed portion of said weld.

9. The combination in means for retaining heat in an autogenous weld being formed along the abutting edges of two metal sheets; of a hood of fire brick adapted for resting on the upper surface of said sheets and provided with a recess for partially surrounding the portion thereof being welded, and a groove for covering the newly formed portion of said weld; a plate of fire brick adapted for being held against the under surface of said sheets and provided with a groove for covering the portion of said sheets being welded and also the newly formed portion of said weld; and means for holding said plate against said sheets.

10. Process of welding contiguous metal edges which comprises progressively applying welding heat to said edges while confining the heat so applied to a narrow zone adjacent the welding point; and progressively enclosing the freshly welded portions while applying thereto heat which is conveyed to the enclosed portions from adjacent the welding point.

11. Process according to claim 10, wherein some of the welding heat which otherwise would be dissipated is reflected onto the contiguous edges ahead of and at the welding point.

In testimony whereof, I affix my signature.
MATTHEW J. WALL.